US008447112B2

(12) United States Patent
Paul et al.

(10) Patent No.: US 8,447,112 B2
(45) Date of Patent: May 21, 2013

(54) METHOD FOR AUTOMATIC LICENSE PLATE RECOGNITION USING ADAPTIVE FEATURE SET

(75) Inventors: Peter Paul, Webster, NY (US); Aaron Michael Burry, Ontario, NY (US); William J. Hannaway, Webster, NY (US); Claude S. Fillion, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 135 days.

(21) Appl. No.: 12/971,643

(22) Filed: Dec. 17, 2010

(65) Prior Publication Data

US 2012/0155712 A1    Jun. 21, 2012

(51) Int. Cl.
*G06K 9/18* (2006.01)
*G06K 9/00* (2006.01)

(52) U.S. Cl.
USPC .......................................... 382/182; 382/105

(58) Field of Classification Search
USPC .......................................................... 382/105
See application file for complete search history.

(56) References Cited

U.S. PATENT DOCUMENTS

| | | | | |
|---|---|---|---|---|
| 5,651,075 | A * | 7/1997 | Frazier et al. ................. | 382/105 |
| 6,091,206 | A * | 7/2000 | Siao ............................... | 315/219 |
| 6,140,941 | A * | 10/2000 | Dwyer et al. .................. | 340/928 |
| 6,339,651 | B1 * | 1/2002 | Tian et al. ....................... | 340/933 |
| 6,553,131 | B1 * | 4/2003 | Neubauer et al. ............. | 382/105 |
| 6,747,687 | B1 * | 6/2004 | Alves ............................ | 348/148 |
| 7,324,015 | B1 * | 1/2008 | Allen et al. ................... | 340/933 |
| 7,339,495 | B2 | 3/2008 | Kavner | |
| 7,970,644 | B2 * | 6/2011 | Hedley et al. ................... | 705/13 |
| 8,027,504 | B2 * | 9/2011 | Simonsson ................... | 382/100 |
| 2002/0140577 | A1 * | 10/2002 | Kavner ......................... | 340/933 |
| 2006/0030985 | A1 * | 2/2006 | Lawida et al. ................. | 701/35 |
| 2006/0278705 | A1 * | 12/2006 | Hedley et al. ................. | 235/384 |
| 2007/0274566 | A1 * | 11/2007 | Fujimoto ...................... | 382/103 |
| 2009/0074249 | A1 * | 3/2009 | Moed et al. ................... | 382/104 |
| 2009/0146845 | A1 * | 6/2009 | Hedley .......................... | 340/936 |
| 2009/0208059 | A1 * | 8/2009 | Geva et al. ................... | 382/105 |
| 2011/0194733 | A1 * | 8/2011 | Wilson ......................... | 382/105 |

OTHER PUBLICATIONS

Alexander Thomas, Vittorio Ferrari, Bastian Leibe, Tinne Tuytelaars, and Luc Van Gool. 2009. Shape-from-recognition: Recognition enables meta-data transfer. Comput. Vis. Image Underst. 113, 12 (Dec. 2009), 1222-1234. DOI=10.1016/j.cviu.2009.03.010 http://dx.doi.org/10.1016/j.cviu.2009.03.010.*

(Continued)

*Primary Examiner* — Stephen R Koziol
*Assistant Examiner* — Jonathan S Lee
(74) *Attorney, Agent, or Firm* — Fox Rothschild LLP

(57) ABSTRACT

A method for determining a confidence level to be used in identifying a vehicle. The method includes receiving a vehicle image, extracting a license plate image from the at least one vehicle image, determining a license plate number and associated confidence level based upon the license plate image, and comparing the associated confidence level against a confidence threshold. If the associated confidence level is below the confidence threshold, the method further includes extracting auxiliary data from the at least one vehicle image, corresponding the extracted auxiliary data and a set of stored auxiliary data, and updating the associated confidence level to produce an updated confidence level based upon the correspondence of the extracted auxiliary data and the set of stored auxiliary data.

19 Claims, 4 Drawing Sheets

OTHER PUBLICATIONS

Robert, K.; , "Video-based traffic monitoring at day and night vehicle features detection tracking," Intelligent Transportation Systems, 2009. ITSC '09. 12th International IEEE Conference on , vol., No., pp. 1-6, Oct. 4-7, 2009.*

Naito, T.; Tsukada, T.; Yamada, K.; Kozuka, K.; Yamamoto, S.; , "Robust license-plate recognition method for passing vehicles under outside environment," Vehicular Technology, IEEE Transactions on , vol. 49, No. 6, pp. 2309-2319, Nov. 2000.*

Wenting Lu, Honggang Zhang, Kunyan Lan, and Jun Guo. 2009. Detection of vehicle manufacture logos using contextual information. In Proceedings of the 9th Asian conference on Computer Vision—vol. Part II (ACCV'09), Hongbin Zha, Rin-ichiro Taniguchi, and Stephen Maybank (Eds.), vol. Part II. Springer-Verlag, Berlin, Heidelberg, 546-555.*

Younghyun Lee; Taeyup Song; Bonhwa Ku; Seoungseon Jeon; Han, D.K.; Hanseok Ko; , "License Plate Detection Using Local Structure Patterns," Advanced Video and Signal Based Surveillance (AVSS), 2010 Seventh IEEE International Conference on , vol., No., pp. 574-579, Aug. 29, 2010-Sep. 1, 2010.*

Qian Gao; Xinnian Wang; Gongfu Xie; , "License Plate Recognition Based On Prior Knowledge," Automation and Logistics, 2007 IEEE International Conference on , vol., No., pp. 2964-2968, Aug. 18-21, 2007.*

Ebrahimi, S.G., Shadow Aware Object Detectio and Vehicle Identification via License Plate Recognition, 2009, Masters Thesis, Eastern Mediterranean University.*

Bellas, N.; Chai, S.M.; Dwyer, M.; Linzmeier, D.; , "FPGA implementation of a license plate recognition SoC using automatically generated streaming accelerators," Parallel and Distributed Processing Symposium, 2006. IPDPS 2006. 20th International , vol., No., pp. 8 pp., Apr. 25-29, 2006.*

* cited by examiner

FIG. 3
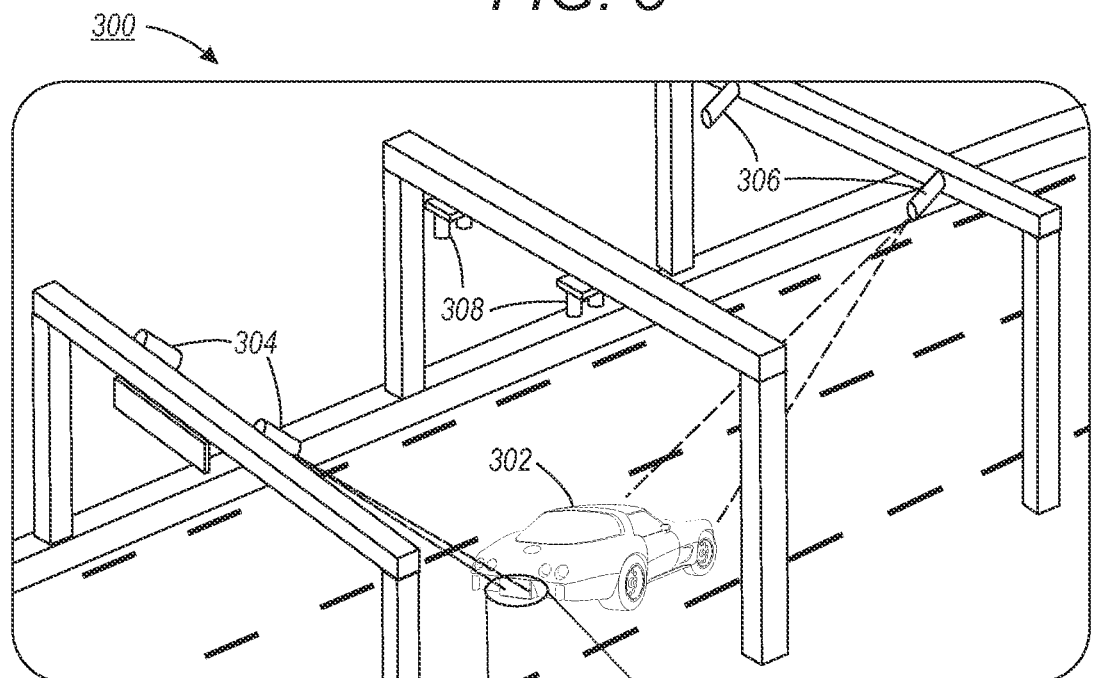
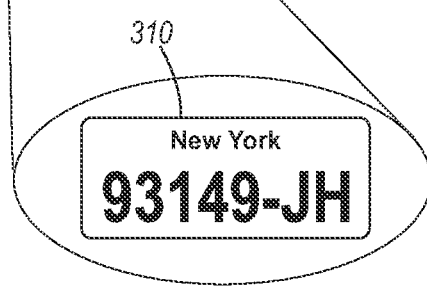
FIG. 3A

METHOD FOR AUTOMATIC LICENSE PLATE RECOGNITION USING ADAPTIVE FEATURE SET

BACKGROUND

The present disclosure relates to automatic license plate recognition. More specifically, the present disclosure relates to improved license plate recognition using an adaptive, extended feature set.

Automatic License Plate Recognition (ALPR) systems are being used more by various companies and organizations as means for identifying and recognizing motor vehicles. For example, many toll highways now use an automatic tolling system that includes license plate recognition. Many tolling systems use a small transponder mounted somewhere on a vehicle. License plate recognition is commonly used to verify that the vehicle using the transponder is the vehicle to which the transponder has been issued. Similar systems are used for parking structures.

Law enforcement entities also use ALPR systems. Red light cameras, speeding cameras, automatic identification of stolen vehicles, and other applications have been developed to assist law enforcement departments. ALPR systems are typically used to identify the owner of a violating vehicle (e.g., in a red light camera or speeding trap camera) by capturing an image of the license plate and identifying the owner of the vehicle based upon a comparison of the license plate content (e.g., the issuing state and the license plate number/letter combination) against one or more databases of vehicle registration information. Similarly, an ALPR system can be used to identify a stolen vehicle by comparing the license plate content of a vehicle against a database of stolen vehicle license plates to determine any potential matches.

Regardless of the application, ALPR systems have inherent drawbacks. Due to naturally occurring factors such as weather and time of day, an image of a license plate may be blurry or incomplete. Similarly, a trailer hitch, license plate cover, or other similar added components may also block or obscure an image of a license plate. Additional factors such as issuing state of license plate not recognized, camera out of calibration, damage to the license plate, contamination such as dirt or other debris on the license plate, and other such factors may also contribute to an obscure license plate image. When a license plate is obscured or otherwise cannot be automatically confirmed, human intervention is required to verify the license plate number.

FIG. 1 illustrates a process used by a conventional ALPR system. The process as shown includes an offline training or initialization process for the ALPR system. The initialization process includes the ALPR system reading 102 a test image including a license plate number. Reading 102 the test image may include applying an object character recognition (OCR) identification algorithm to the test image. An exemplary OCR identification algorithm isolates one or more characters from the license plate number of the test image, segments multiple characters into a single character image, and compares the single character image against a set of standard character images to determine each character that is read from the test image. After determining each character in the test image, the OCR identification algorithm produces a results set including a character string indicating the characters contained in the license plate of the test image. The results of reading 102 are corrected by a human operator. For example, if a test license plate image reads "New York ABC-123," the OCR identification algorithm used by the ALPR system may interpret the test license plate image to read 102 "Pennsylvania A3C-123."

The human operator may manually examine the test image and enter the correct information contained in the image. Based upon the entered information, the OCR parameters for the OCR identification algorithm may be adjusted 104 to increase the accuracy of the OCR identification algorithm. For example, based upon the entered information, the parameters for identifying the issuing state may be adjusted 104 to include additional features for use in recognizing a license plate issued by the state government of New York. Once the ALPR system reaches a certain accuracy level (e.g., 80% accurate for a set of 100 test images), the ALPR system or an operator of the ALPR system may determine 106 that the training is complete. Once the ALPR system training is complete, the ALPR system enters an active state. If the training is not determined 106 to be complete, additional test images may be read 102, and the OCR parameters may be further adjusted 104 as previously discussed. It should be noted that the training or initialization procedure may be completed once for each ALPR system upon installation, intermittently or at regular time intervals, such as daily, weekly, monthly, etc., to ensure overall system accuracy and performance is maintained.

After training, the ALPR system may operate in a ready state until a license plate image is obtained from a vehicle passing an image capture device of an ALPR system. The image capture device may include a digital still camera, a digital video recording camera, a photocell, or other devices capable of capturing and producing an image. The image capture device may be triggered by a vehicle detecting sensor such as a weight sensor embedded in the road or a photosensitive eye directed toward a traffic lane. The vehicle sensing device may be configured such that when a vehicle is passing the vehicle sensing device the image capture device is triggered. The image capture device then captures at least one image of the vehicle. In some applications, the ALPR system may include multiple image capture devices configured to photograph multiple parts of a vehicle, such as front bumper, rear bumper, windshield, and various other parts of the vehicle. These images may then be combined into a single representative vehicle image or a set of representative vehicle images. The image or images may be read 108 by the ALPR system.

The ALPR system performs 110 the OCR identification algorithm with the set parameters from the training or initialization process. Depending on the quality of the vehicle image, the OCR identification algorithm may be able to identify the characters representing the vehicle's license plate number and record those characters in a character string. If a resulting character string is determined 112 by the OCR identification algorithm, the results are reported 116 to a particular business or organization such as a billing authority for a highway department. If a resulting character string is not determined 112 by the OCR identification algorithm, the vehicle image or images are routed to a human operator such that human interpretation of the license plate from the images is obtained 114. The results of the human interpretation are then reported 116.

The above process is used in many applications, including automated toll booths, speeding cameras, red light cameras, and other similar applications. However, each application has inherent drawbacks. For example, weather conditions may impact the quality of the image obtained. If it is raining or foggy when an image is obtained, the OCR identification algorithm may not produce a result and thus human interpretation is required to identify the image. Similarly, images obtained at night may also lack clarity and require a higher level of human interpretation. Reducing human interpretation even 1% in a high traffic area may lead to considerable financial savings.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a method for determining a confidence level to be used in identifying a vehicle. The method includes receiving, by a processing device, at least one vehicle image; determining, by the processing device, a license plate number and associated confidence level based upon the at least one vehicle image; extracting, by the processing device, auxiliary data from the at least one vehicle image; corresponding, by the processing device, the extracted auxiliary data and a set of stored auxiliary data; and updating, by the processing device, the associated confidence level to produce an updated confidence level based upon the correspondence of the extracted auxiliary data and the set of stored auxiliary data.

In another general respect, the embodiments disclose a method for determining a confidence level to be used in identifying a vehicle. The method includes receiving, by a processing device, at least one vehicle image; extracting, by the processing device, a license plate image from the at least one vehicle image; determining, by the processing device, a license plate number and associated confidence level based upon the license plate image; extracting, by the processing device, auxiliary data from the at least one vehicle image; corresponding, by the processing device, the extracted auxiliary data and a set of stored auxiliary data; updating, by the processing device, the associated confidence level to produce an updated confidence level based upon the correspondence of the extracted auxiliary data and the set of stored auxiliary data; and comparing, by the processing device, the updated confidence level against a confidence threshold.

In another general respect, the embodiment disclose a method for determining a confidence level to be used in identifying a vehicle. The method includes receiving, by a processing device, a vehicle image; extracting, by the processing device, a license plate image from the at least one vehicle image; determining, by the processing device, a license plate number and associated confidence level based upon the license plate image; and comparing the associated confidence level against a confidence threshold. If the associated confidence level is below the confidence threshold, the method further includes extracting, by the processing device, auxiliary data from the at least one vehicle image; corresponding, by the processing device, the extracted auxiliary data and a set of stored auxiliary data; and updating, by the processing device, the associated confidence level to produce an updated confidence level based upon the correspondence of the extracted auxiliary data and the set of stored auxiliary data.

BRIEF DESCRIPTION OF THE DRAWINGS

FIG. 3 illustrates various embodiments of a vehicle imaging system configured to acquire a license plate image, shown in FIG. 3A.

DETAILED DESCRIPTION

For purposes of the discussion below, the term "database" refers to an organized collection of data written in a data structure stored on a computer readable medium. A database may include one or more sets of related information organized into individual cells, rows of cells, columns of cells, or defined groups of cells. Information stored in a first database may also be related to information stored in a second database. As used herein, a "database" is understood to include one or more databases.

The term "license plate number" as used herein refers to any identification number or markings used to identify a particular vehicle. These identification numbers of markings may include, but are not limited to, state issued license plates, a vehicle identification number, airplane identification numbers or markings, boat identification numbers or markings, and/or any other identification numbers or markings used to identify a vehicle.

An "image" or "vehicle image" as used herein refers to a digital representation of an image of a particular vehicle obtained by an image capture device. The image may include a license plate number, vehicle identification number, or other similar markings or distinguishing features of the particular vehicle.

Figure 1:
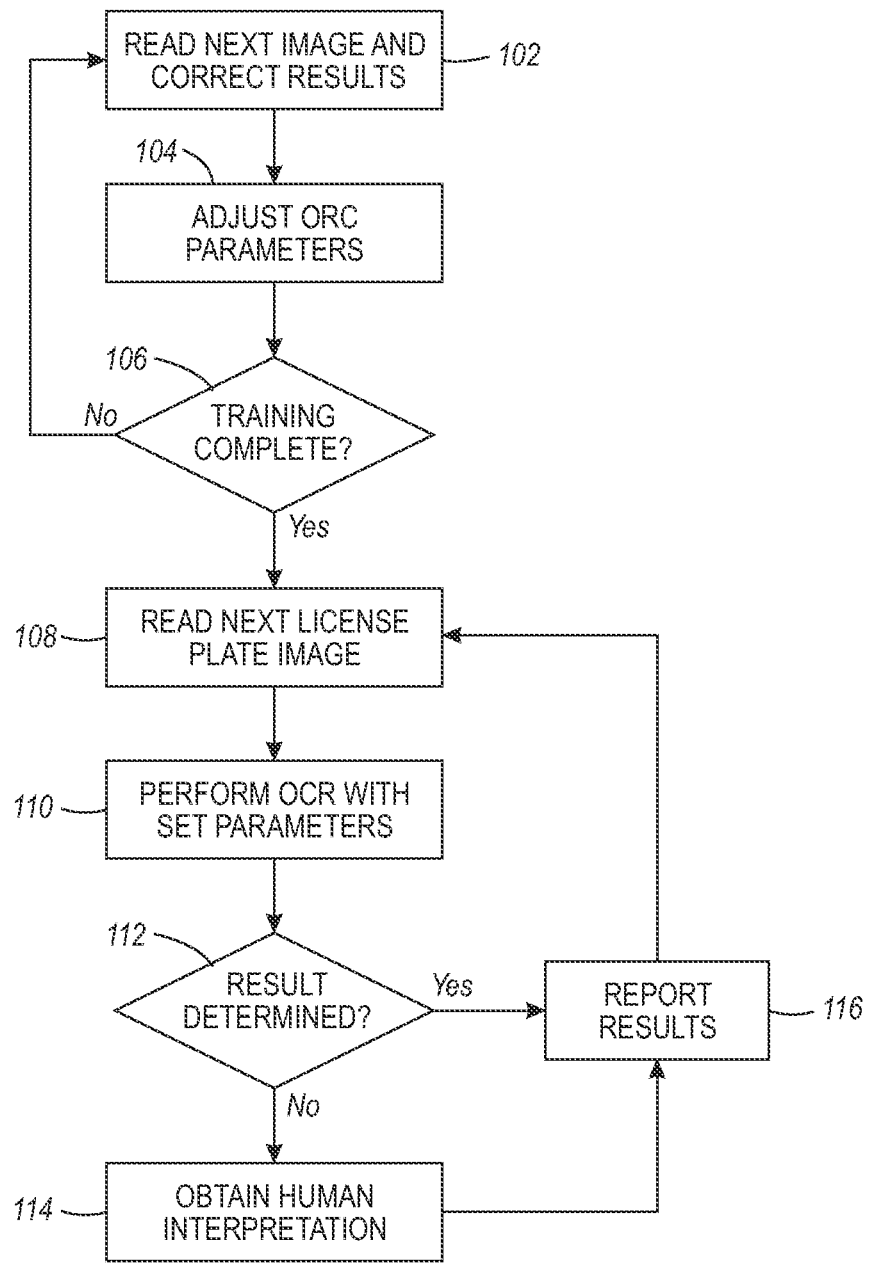
FIG. 1 illustrates a flow diagram for a prior art process of operating an automatic license plate recognition (ALPR) system.
Figure 2:
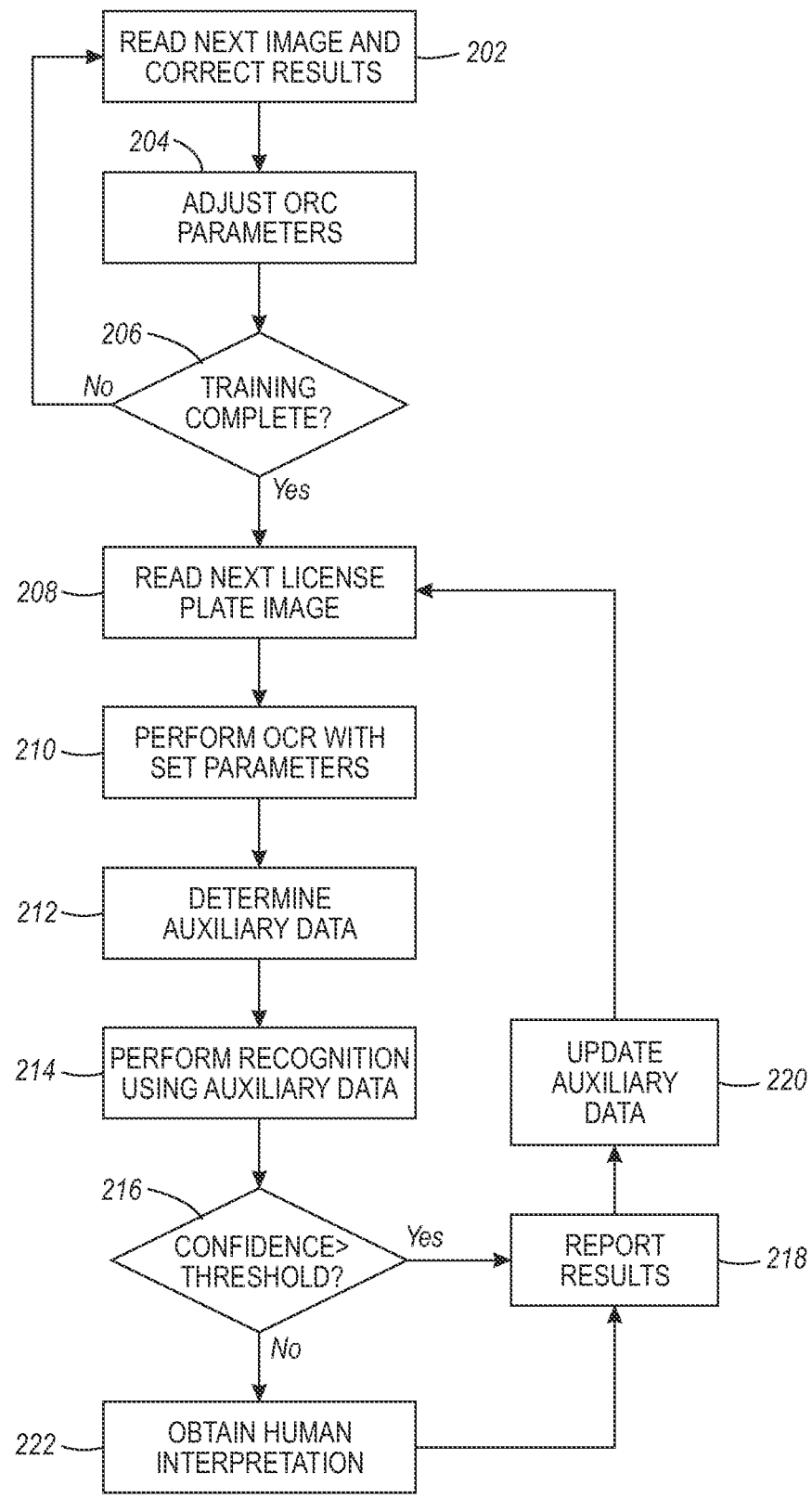
FIG. 2 illustrates a flow diagram for an exemplary improved process for operating an ALPR system according to an embodiment.

FIG. 2 illustrates an exemplary process used by an ALPR system according to an embodiment of the present disclosure. The process as shown in FIG. 2 includes an offline training or initialization process for the ALPR system such as that as shown in FIG. 1. The initialization process may include the ALPR system reading 202 a test image including a license plate number. Reading 202 the test image may include applying an object character recognition (OCR) identification algorithm to the test image. An exemplary OCR identification algorithm may isolate one or more characters from the license plate number of the test image, segment multiple characters into a set of single character images, and compare each of the set of single character images against a set of standard character images to determine each character that is read from the test image. After determining each character in the test image, the OCR identification algorithm may produce a results set including a character string indicating the characters contained in the license plate of the test image. The results set may then be displayed for review and, if necessary, corrected by a human operator. For example, if a test license plate image reads "New York ABC-123," the OCR identification algorithm used by the ALPR system may interpret the test license plate image to read 202 "Pennsylvania A3C-123." The human operator may manually examine the test image and the results set, and, if the results set does not match the image, correct the character string contained in the result set to accurately reflect the information contained in the image. Based upon the entered information, the OCR parameters for the identification algorithm may be adjusted 204 to increase the accuracy of the OCR identification algorithm. For example, based upon the entered information, the parameters for identifying the issuing state may be adjusted 204 to include additional features for use in recognizing a license plate issued by New York. Additional features may include color combinations commonly used, background designs commonly used, letter/number arrangement and spacing, and other similar features. Once the ALPR system reaches a predetermined accuracy level for an image set of at least a predetermined size (e.g., 80% accurate for a set of 100 test images), the ALPR system or an operator of the ALPR system may determine 206 that the training is complete. If the ALPR system training is complete, the ALPR system may enter an online or active state. If the training is not determined 206 to be complete, additional test images may be read 202, and the OCR parameters may be further adjusted 204. It should be noted that the training or initialization procedure may be completed once for each ALPR system upon installation, intermittently, or at regular time intervals such as daily, weekly, monthly, etc.

After training, the ALPR system may operate in a ready state until a license plate image is obtained from a vehicle passing an image capture device of an ALPR system. The image capture device may include a digital still camera, a digital video recording camera, a photocell, and/or any other device capable of capturing and producing an image. The image capture device may be triggered by a vehicle-sensing device such as a weight sensor embedded in the road or a photosensitive eye directed toward a traffic lane. The vehicle-sensing device may be configured such that the image capture device is triggered when a vehicle is passing the vehicle-sensing device. The image capture device may then capture at least one image of the vehicle. In some applications, the ALPR system may include multiple image capture devices configured to photograph multiple parts of a vehicle, such as front bumper, rear bumper, windshield, and various other parts of the vehicle. These images may then be combined into a single representative vehicle image or set of representative images. The ALPR system may receive and read 208 the image or set of images. The ALPR system may perform a low level of processing such as image calibration and noise reduction on the one or more vehicle images. Similarly, an image segmentation algorithm may be performed to locate, isolate and extract an image of the license plate from the vehicle image. The segmentation algorithm may be configured to locate specific attributes in the vehicle image to isolate the license plate such as contrasting color, a rectangular shape defined by the license plate, light reflection created by a camera flash or other exterior light against the metal of the license plate, and other similar attributes.

A similar segmentation algorithm may further isolate and extract each individual character from the license plate image. The ALPR system may perform 210 the OCR identification algorithm with the set parameters from the training or initialization process on each identified character. The ALPR system may also determine an associated confidence level for each recognized character. The confidence level may be based upon various conditions such as clarity of the character, lighting and contrast of the character, and other similar conditions. The OCR identification algorithm may incorporate various technologies such as support vector machines (i.e., specialized algorithms configured to analyze data and identify patterns), neural networks (i.e., mathematical or computational models applied to data sets to determine patterns among the data), fuzzy logic (i.e., probabilistic algorithms configured to produce approximate results), genetic algorithm based optimization techniques (i.e., heuristics configured to approximate natural evolution patterns in a data set), Bayesian statistics and decision making algorithms (i.e., statistical analysis algorithms configured to determine relationships among data via set theory), or other known methods for OCR.

The OCR identification algorithm may identify several possible characters, each character having an associated confidence level. Each of these characters may be included in a version of the results of the OCR identification algorithm, along with the accompanying confidence level. For example, the segmentation algorithm may determine that six total characters are present in the license plate. The OCR identification algorithm may be performed 210 on each character. The OCR identification algorithm may return a single match for the first five characters. However, the sixth character may return two possible matches, e.g., "B" or "3," each character having an associated confidence level. Thus, two separate results of the OCR identification algorithm may be obtained. A first result may include the first five characters, "B," and its associated confidence level. A second result may include the first five characters, "3," and its associated confidence level.

To determine the associated confidence level, the OCR identification algorithm may associate a confidence number for each character in the license plate number. For example, for each character that returns a single match, the confidence number for that character may be 1. For each character that returns multiple matches, the confidence number may be reduced accordingly based on the number of matches. For example, if a character returns two matches, its associated confidence number may be 0.40. If a character returns three matches, its associated confidence number may be 0.25. The confidence numbers for each character in the license plate image may be averaged together to determine the associated confidence level for that license plate. Alternatively, the associated confidence level may be set to the lowest confidence number in the character set.

In addition to the license plate image, additional auxiliary data may be determined 212 from the vehicle image. The auxiliary data may include two or more components. For example, the auxiliary data may include vehicle specific data and commuter data. Vehicle data may be determined by various image processing algorithms and include vehicle color (if a color camera or image acquisition device is used), vehicle shape, vehicle design elements near the license plate, distinguishing marks (e.g., rust streaks, bent license plate, dents, bumper stickers, and other distinguishing marks), physical attributes, customized features, vehicle make, vehicle model, model badges and emblems, and any other data related to the vehicle. Vehicle data may also include data related to the license plate itself, such as dealer frame, location, angle of mounting, defects, painted logos, decals, and other data related to the license plate. Various images obtained from multiple cameras or image capture devices may be used to determine 212 auxiliary data such as vehicle data.

Vehicle data may be stored in a data structure such as a linked list or a tree, or as an entry in a database. An exemplary set of vehicle data may be:

<Vehicle Color>
  <Red>
<Vehicle Shape>
  <Rectangular Tail Light 4.00 Plate Widths to Left of Plate>
<Vehicle Distinguishing Marks>
  <Dent on Rear Left Fender>

```
<Vehicle Design Elements>
    <Thin Vertical Line 1.25 Plate Widths to Left of Plate>
    <Thin Vertical Line 1.25 Plate Widths to Right of Plate>
<Vehicle Make>
    <Toyota>
<Vehicle Model Emblem>
    <"Camry" badge 3.75 Plate Widths to Right of Plate>
```

It should be noted the above set of vehicle data is shown by way of example only. It should also be noted that the geometric dimensions shown in the above data set (i.e., plate widths) is shown by way of example. Additional dimensions may be used including units (e.g., inches, centimeters, millimeters) calibrated based upon a known width of a license plate as compared to a measured width of the license plate in the vehicle image. By using plate widths or calibrated units based upon measured plate width, consistency between images may be maintained.

Additional auxiliary data may be determined 212 for a vehicle as well. For example, commuter related data may be determined 212 for a vehicle. Many vehicles using an automated tolling system may be repeat users, and data may be collected related to repeat uses or activities. For example, commuter data may include time of day, day of the week, location, and other related data. An exemplary set of commuter data may be:

```
<Time of Day>
    <8:15>
<Day of the Week>
    <Monday>
<Location>
    <On-Ramp #10>
```

It should be noted that the set of commuter data as shown above is shown by way of example only. The ALPR system may log commuter data when the vehicle image is captured. It may be stored with the captured image and made available for review or use in determining a correct vehicle license plate number.

The ALPR system may perform 214 recognition of the license plate image using the stored auxiliary data. The results from the OCR identification algorithm may be combined with any determined 212 auxiliary data to perform final vehicle recognition. The OCR identification algorithm results, the vehicle data, and the commuter data may be gathered together to form a set of test data, that is, the data representing the license plate being recognized. The ALPR may access a database of license plate numbers and accompanying auxiliary data to compare or correspond the test data in order to determine a final recognition.

In order to accurately store a set of commuter data, the commuter data may further include a set of related statistics. For example, a commuter may not pass through the same image capture station at the same time every day, nor the same days every week. However, the distribution of times and days may have a defined pattern for most commuters. In addition, commuters may not be detected in the same location every day, but overall highway usage patterns may be determined. By gathering and storing data over time, the ALPR system may determine related commuter statistics and store them along with the other auxiliary data in a database. For example, a set of related commuter statistics may be:

```
<Mondays>
    <On-Ramp #10>
        <Mean>
            <8:20 AM>
        <Standard Deviation>
            <15 minutes>
    <On-Ramp #35>
        <Mean>
            <6:30 AM>
        <Standard Deviation>
            <20 minutes>
<Tuesdays>
    <On-Ramp #12>
        <Mean>
            <8:45 AM>
        <Standard Deviation>
            <12 minutes>
    <On-Ramp #35>
        <Mean>
            <6:30 AM>
        <Standard Deviation>
            <10 minutes>
```

It should be noted that the set of related commuter statistics as shown above is shown by way of example only. It should also be noted that standard statistical analysis may be performed to determine several of the commuter statistics such as standard deviation values. The set of commuter statistics, as well as the above discussed commuter data (e.g., the auxiliary data) may be updated and stored according to a predetermined schedule. For example, each time an image of the vehicle is obtained, the auxiliary data may be updated accordingly. The auxiliary data may be maintained for a specific period of time as well. For example, the auxiliary data may be maintained until the auxiliary data has not been updated for a year. After the year, the auxiliary data may be determined to be obsolete and may be deleted.

The ALPR system may perform 214 the final recognition for each result of the OCR identification algorithm based upon stored auxiliary data. Each result of the OCR identification algorithm is loaded from a database including any associated auxiliary data. Based upon a comparison of the OCR results, the auxiliary data determined 212 as the vehicle passes the image capture device, and the loaded auxiliary data, an updated confidence level for each OCR identification algorithm may be determined.

As before, to determine the updated confidence level, several approaches may be used. For example, for each auxiliary data that matches a stored record, the original associated confidence level may be increased accordingly such that the original associated confidence level is scaled closer to the upper limit of the confidence level. Alternatively, a second confidence level may be obtained based solely upon the auxiliary data. This second confidence level may then be averaged with the original associated confidence level to produce the updated confidence level.

As an example, a vehicle image is obtained, read 208 and a license plate image is isolated. The OCR identification algorithm may be performed 210, and based upon the OCR identification algorithm, the ALPR system may return the following results:

New York: 93149-JH, Confidence=0.4
New York: 93149-J4, Confidence=0.4

Because neither result has a high confidence level, additional information or auxiliary data obtained from the vehicle image may be used to determine the license plate number. For example, the following data may be determined 212 from the vehicle image:

```
<Vehicle Shape>
    <Rectangular Tail Light 3.25 Plate Widths Left of License Plate>
<Vehicle Design Elements>
    <Thin Vertical Line 0.25 Plate Widths to Left of Plate>
    <Thin Vertical Line 2.75 Plate Widths to Left of Plate>
    <Horizontal Line 1.5 Plate Heights below Plate>
<Vehicle Model Emblem>
    <"E250" Badge 2.5 Plate Widths to Left of Plate>
<Time of Day>
    <08:15 AM>
<Day of Week>
    <Monday>
<Location>
    <On-Ramp 10>
```

Auxiliary data for both potential license plate numbers (i.e., New York: 93149-JH and New York: 93149-J4) may be loaded from memory. The auxiliary data may read as follows:

```
<NY: 93149-JH>
<Vehicle Shape>
    <Rectangular Tail Light 3.25 Plate Widths Left of License Plate>
<Vehicle Design Elements>
    <Thin Vertical Line 0.25 Plate Widths to Left of Plate>
    <Thin Vertical Line 2.75 Plate Widths to Left of Plate>
    <Horizontal Line 1.5 Plate Heights below Plate>
<Vehicle Model Emblem>
    <"E250" Badge 2.5 Plate Widths to Left of Plate>
<Mondays>
    <On-Ramp 10>
        <Mean><08:20 AM>
        <Standard Deviation><15 min>
    <On-Ramp 35>
        <Mean><06:30 AM>
        <Standard Deviation><20 min>
<NY: 93149-J4>
<Vehicle Shape>
    <Circular Tail Light 4.5 Plate Widths Left of License Plate>
<Vehicle Design Elements>
    < >
<Vehicle Model Emblem>
    <"Lexus" Badge 3.5 Plate Widths to Left of Plate>
<Mondays>
    <On-Ramp 10>
        <Mean><07:20 AM>
        <Standard Deviation><10 min>
    <On-Ramp 35>
        <Mean><06:05 AM>
        <Standard Deviation><25 min>
```

Based upon the OCR identification algorithm, and a comparison of corresponding likenesses between the extracted auxiliary data and stored auxiliary data, the ALPR system may be able to perform 214 a more detailed and accurate recognition of the vehicles based upon the auxiliary data and adjust the confidence levels. For example, the confidence levels of the results of the OCR identification algorithm may now be:
New York: 93149-JH, Confidence=0.9
New York: 93149-J4, Confidence=0.2

The ALPR system may compare 216 the updated confidence levels for each license plate against a confidence threshold. According to an exemplary comparison and correspondence algorithm, if one of the updated confidence levels is higher than the confidence threshold, the result of the OCR identification algorithm having the highest confidence level may be reported 218 to a requesting authority such as an automated tolling system billing department or a law enforcement agency. Similarly, the auxiliary data stored in association with the identified license plate number may be updated 220 to include the auxiliary data determined 212 from the current vehicle image.

Updating 220 the auxiliary data on a continual basis may improve the overall accuracy of the ALPR system. As stated above, initially the auxiliary data associated with each license plate may be empty. This may occur if the related database has no information on the vehicle data or the commuter data. Initially, the ALPR system may not have any stored information related to the color, shape, design, emblems on a vehicle, or any other information related to the identification of a vehicle. Similarly, the ALPR system may not have any stored information related to times and places where a particular vehicle is likely to be traveling. Thus, initially, the ALPR system may rely solely on the OCR identification algorithm results based upon a captured image, or resulting human interpretation, to determine license plate characters. However, even the first time the ALPR system captures an image of a vehicle, the system may extract various auxiliary data from the image such as vehicle and commuter data and stores this data into the associated database for the recognized (whether automatically or by human interpretation) license plate. The ALPR system may also calculate the various related statistics for the commuter data and write those statistics into the database as well. Subsequently, when the ALPR system captures an image of the vehicle, the auxiliary data associated with the vehicle will now not be empty; rather, it may include meaningful information to aid in the license plate recognition process, thus improving the confidence level of an identified license plate.

The auxiliary data may be organized into a database having three sets of related data: (1) Vehicle data; (2) Commuter data; and (3) associated license plate number. Based upon the number of times a vehicle image has been captured, and the relevant information that may be extracted from those images, the vehicle data and the commuter data may be more robust sets of information than the associated license plate number. However, these robust sets of information may be more important to identifying a vehicle based upon an image obtained in noisy conditions (e.g., bad weather or dim lighting) than the associated license plate number.

If the comparison 216 indicates no results of the OCR identification algorithm have a confidence level above the confidence threshold, or if the comparison indicates there are two or more results of the OCR identification algorithm that are above the confidence threshold, the results may be sent to a human operator to obtain 222 human interpretation. A human operator may manually view the vehicle and plate images on a computer screen and determine the license plate characters. The operator may then enter the plate characters into the ALPR system and report 218 the result.

To continue the above example, the confidence threshold may be 0.85. The ALPR system may compare 216 the updated confidence level of each OCR identification algorithm result against the confidence threshold. Thus, NY: 93149-JH may return a positive result of the comparison 216 as its associated confidence level is above the confidence threshold. Conversely, NY: 93149-J4 may return a negative result of the comparison 216 as its associated confidence level is below the confidence threshold. As such, the ALPR system report 218 the license plate as NY: 93149-JH, update 220 the stored auxiliary data with the data extracted from the vehicle image, and continue processing 208 the next vehicle image.

It should be noted that the above discussed process is shown by way of example only and may be modified depending on the specific ALPR system. For example, in a highway tolling system, various data or collected information may be weighted based upon various conditions. For example, after dark or in bad weather, the OCR identification algorithm results may have less weight than the auxiliary data in determining the license plate number as the OCR identification algorithm results may have a higher likelihood of being inaccurate due to the light levels or weather. Similarly, various components of the auxiliary data may be weighted more than others. For example, the time and location information may have a lower weight as these are likely to vary. Vehicle make, model, color and other information that is highly unlikely to change may have a higher weighting.

FIG. 3 illustrates an exemplary vehicle imaging system 300 configured to acquire license plate images as well as various other vehicle related images. For example, as vehicle 302 passes through the system 300, various cameras 304 and 306 may be positioned and configured to acquire various images of the vehicle. The cameras 304 may be positioned to acquire an image of the rear of the vehicle 302 while cameras 306 may be positioned to acquire an image of the front of the vehicle as well as the driver of the vehicle for identification purposes. The system 300 may also include various transceivers 308 configured to transmit to and receive a signal from a transponder (e.g., an EZPass transponder) within the vehicle 302. The signal may include an identification number used for billing and other related functions. The cameras 304 and 306 may acquire various images of the vehicle 302 including license plate image 310 (shown in detail in FIG. 3A) and images including various auxiliary data such as make and model of the vehicle. This information may be passed to a computer hardware system like that discussed in FIG. 4 below for additional processing.

Figure 4:
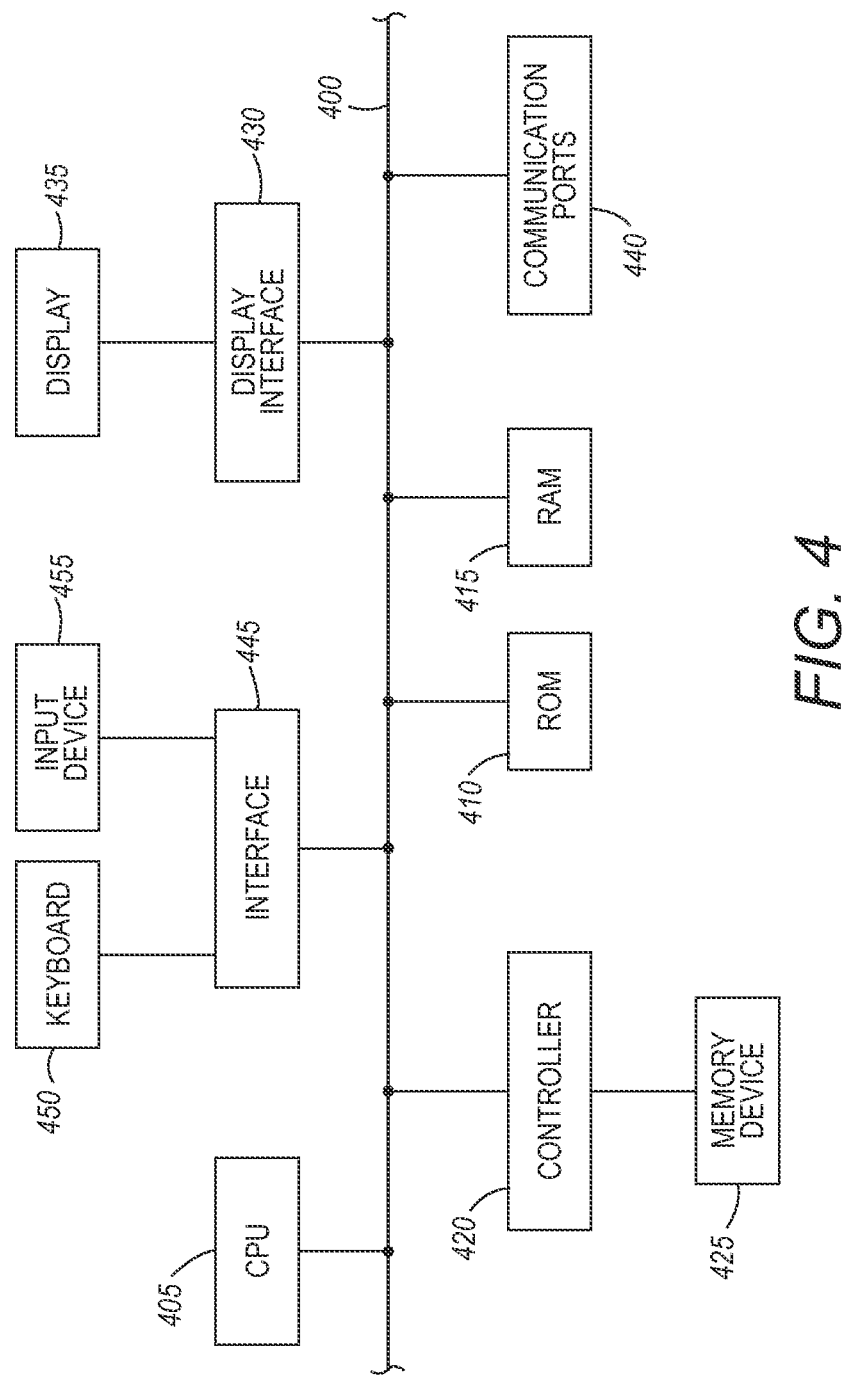
FIG. 4 illustrates various embodiments of a computing device for implementing various methods and processes described herein.

FIG. 4 depicts a block diagram of exemplary internal hardware that may be used to contain or implement the various ALPR systems as discussed above, connect to vehicle imaging system 300 to receive various vehicle images, as well as perform the process illustrated in FIG. 2. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an exemplary processing device, computing device or processor as such terms are used within this disclosure. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any the identification process associated with the ALPR systems as discussed above may be stored in the ROM 410 and/or the RAM 415. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 430 may permit information from the bus 400 to be displayed on the display 435 in audio, visual, graphic or alphanumeric format. The information may include information related to the current operating status of an ALPR system. Communication with external devices may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for determining a confidence level to be used in identifying a vehicle comprising:
   receiving, by a processing device, at least one vehicle image;
   determining, by the processing device, a license plate number, wherein the license plate number comprises a plurality of characters;
   determining, by the processing device, a confidence score for each of the plurality of characters, thereby resulting in a plurality of confidence scores for the vehicle image;
   determining, by the processing device, an associated confidence level based upon the at least one vehicle image and the confidence score for each of the plurality of characters;
   extracting, by the processing device, auxiliary data from the at least one vehicle image, wherein the auxiliary data comprises information related to physical details of the vehicle;
   corresponding, by the processing device, the extracted auxiliary data and a set of stored auxiliary data; and
   updating, by the processing device, the associated confidence level by updating the confidence score for each of the plurality of characters to produce an updated confidence level based upon the correspondence of the extracted auxiliary data and the set of stored auxiliary data,
   wherein the extracted auxiliary data and the plurality of confidence scores each comprise an associated weight, and wherein the extracted auxiliary data comprises a higher associated weight than the plurality of confidence scores if the vehicle image comprises a high likelihood of being inaccurate due to various conditions during image acquisition.

2. The method of claim 1, wherein the determining a license plate number and associated confidence level further comprises performing an optical character recognition (OCR) identification algorithm on the at least one vehicle image.

3. The method of claim 2, wherein performing the OCR identification algorithm comprises:
   extracting a license plate image from the vehicle image, wherein the license plate image comprises the plurality of characters;
   segmenting each of the plurality of characters in the license plate image;
   comparing each of the segmented characters against a set of standard character images; and
   assigning a confidence score to each of the segmented characters.

4. The method of claim 1, wherein the auxiliary data comprises at least one of vehicle color, vehicle shape, vehicle design elements near the license plate, distinguishing marks, physical attributes, customized features, vehicle make, vehicle model, and model badges and emblems.

5. The method of claim 1, wherein the auxiliary data comprises at least one of time of day, day of the week, and location.

6. The method of claim 1, further comprising updating the set of stored auxiliary data upon updating the confidence level.

7. The method of claim 1, further comprising comparing the updated confidence level against a confidence threshold.

8. The method of claim 7, further comprising:
reporting the license plate number if the updated confidence level is higher than the confidence threshold; and
obtaining human interpretation if the updated confidence level is lower than the confidence threshold.

9. The method of claim 1, wherein the set of stored auxiliary data is stored on a non-transitory processor readable storage medium operably connected to the processing device.

10. A method for determining a confidence level to be used in identifying a vehicle comprising:
receiving, by a processing device, at least one vehicle image;
extracting, by the processing device, a license plate image from the at least one vehicle image;
determining, by the processing device, a license plate number, wherein the license plate number comprises a plurality of characters;
determining, by the processing device, a confidence score for each of the plurality of characters, thereby resulting in a plurality of confidence scores for the vehicle image;
determining, by the processing device, an associated confidence level based upon the license plate image and the confidence score for each of the plurality of characters;
extracting, by the processing device, auxiliary data from the at least one vehicle image, wherein the auxiliary data comprises information related to physical details of the vehicle;
corresponding, by the processing device, the extracted auxiliary data and a set of stored auxiliary data;
updating, by the processing device, the associated confidence level by updating the confidence score for each of the plurality of characters to produce an updated confidence level based upon the correspondence of the extracted auxiliary data and the set of stored auxiliary data; and
comparing, by the processing device, the updated confidence level against a confidence threshold,
wherein the extracted auxiliary data and the plurality of confidence scores each comprise an associated weight, and wherein the extracted auxiliary data comprises a higher associated weight than the plurality of confidence scores if the vehicle image comprises a high likelihood of being inaccurate due to various conditions during image acquisition.

11. The method of claim 10, wherein the determining a license plate number and associated confidence level further comprises performing an optical character recognition (OCR) identification algorithm on the license plate image.

12. The method of claim 11, wherein performing the OCR identification algorithm comprises:
identifying the plurality of characters in the license plate image;
segmenting each of the plurality of characters in the license plate image;
comparing each of the segmented characters against a set of standard character images; and
assigning a confidence score to each of the segmented characters.

13. The method of claim 10, wherein the auxiliary data comprises at least one of vehicle color, vehicle shape, vehicle design elements near the license plate, distinguishing marks, physical attributes, customized features, vehicle make, vehicle model, and model badges and emblems.

14. The method of claim 10, wherein the auxiliary data comprises at least one of time of day, day of the week, and location.

15. The method of claim 10, further comprising:
reporting the license plate number if the updated confidence level is higher than the confidence threshold; and
obtaining human interpretation if the updated confidence level is lower than the confidence threshold.

16. A method for determining a confidence level to be used in identifying a vehicle comprising:
receiving, by a processing device, a vehicle image;
extracting, by the processing device, a license plate image from the at least one vehicle image;
determining, by the processing device, a license plate number, wherein the license plate number comprises a plurality of characters;
determining, by the processing device, a confidence score for each of the plurality of characters, thereby resulting in a plurality of confidence scores for the vehicle image;
determining, by the processing device, an associated confidence level based upon the license plate image and the confidence score for each of the plurality of characters;
comparing the associated confidence level against a confidence threshold; and
if the associated confidence level is below the confidence threshold:
extracting, by the processing device, auxiliary data from the at least one vehicle image, wherein the auxiliary data comprises information related to physical details of the vehicle,
corresponding, by the processing device, the extracted auxiliary data and a set of stored auxiliary data, and
updating, by the processing device, the associated confidence level by updating the confidence score for each of the plurality of characters to produce an updated confidence level based upon the correspondence of the extracted auxiliary data and the set of stored auxiliary data,
wherein the extracted auxiliary data and the plurality of confidence scores each comprise an associated weight, and wherein the extracted auxiliary data comprises a higher associated weight than the plurality of confidence scores if the vehicle image comprises a high likelihood of being inaccurate due to various conditions during image acquisition.

17. The method of claim 16, wherein the determining a license plate number and associated confidence level further comprises performing an object character recognition (OCR) identification algorithm on the license plate image.

18. The method of claim 17, wherein performing the OCR identification algorithm comprises:
identifying the plurality of characters in the license plate image;
segmenting each of the plurality of characters in the license plate image;
comparing each of the segmented characters against a set of standard character images; and assigning a confidence score to each of the segmented characters.

19. The method of claim 16, further comprising:
reporting the license plate number if the updated confidence level is higher than the confidence threshold; and
obtaining human interpretation if the updated confidence level is lower than the confidence threshold.

* * * * *